United States Patent [19]

Orris et al.

[11] 4,158,159
[45] Jun. 12, 1979

[54] ELECTRONIC CIRCUIT CONTROLLER FOR WINDSHIELD WIPER DRIVE MOTOR

[75] Inventors: Stephen J. Orris, Allen Park; Frederick O. R. Misterfeld, Troy, both of Mich.

[73] Assignee: Chrysler Corporation, Highland Park, Mich.

[21] Appl. No.: 893,909

[22] Filed: Apr. 5, 1978

Related U.S. Application Data

[63] Continuation of Ser. No. 792,379, Apr. 29, 1977, abandoned.

[51] Int. Cl.² .............................................. H02P 7/28
[52] U.S. Cl. .............................. 318/443; 318/DIG. 2
[58] Field of Search ............... 318/443, 444, 305, 379, 318/DIG. 2; 307/10 R; 15/250.02

[56] References Cited

U.S. PATENT DOCUMENTS

| | | | |
|---|---|---|---|
| 3,492,558 | 1/1970 | Patterson, Jr. et al. | 318/443 |
| 3,604,997 | 9/1971 | Kirchner et al. | 318/443 |
| 3,691,442 | 9/1972 | Sheldrake | 318/443 |
| 3,869,654 | 3/1975 | Bischoff et al. | 318/443 |
| 4,037,146 | 7/1977 | Kondo | 318/444 |

*Primary Examiner*—J. V. Truhe
*Assistant Examiner*—W. E. Duncanson, Jr.
*Attorney, Agent, or Firm*—Baldwin & Newtson

[57] ABSTRACT

A windshield wiper drive motor and washer pump motor control system providing a selection of intermittent wipe and continuous wiping actions. The intermittent wipe mode of operation features selectable variable delay periods between successive wiping cycles, a first wipe-before-delay mode of operation and a wipe-after-wash mode of operation which affords at least one extra wiping cycle of the motor after release of the wash switch.

13 Claims, 1 Drawing Figure

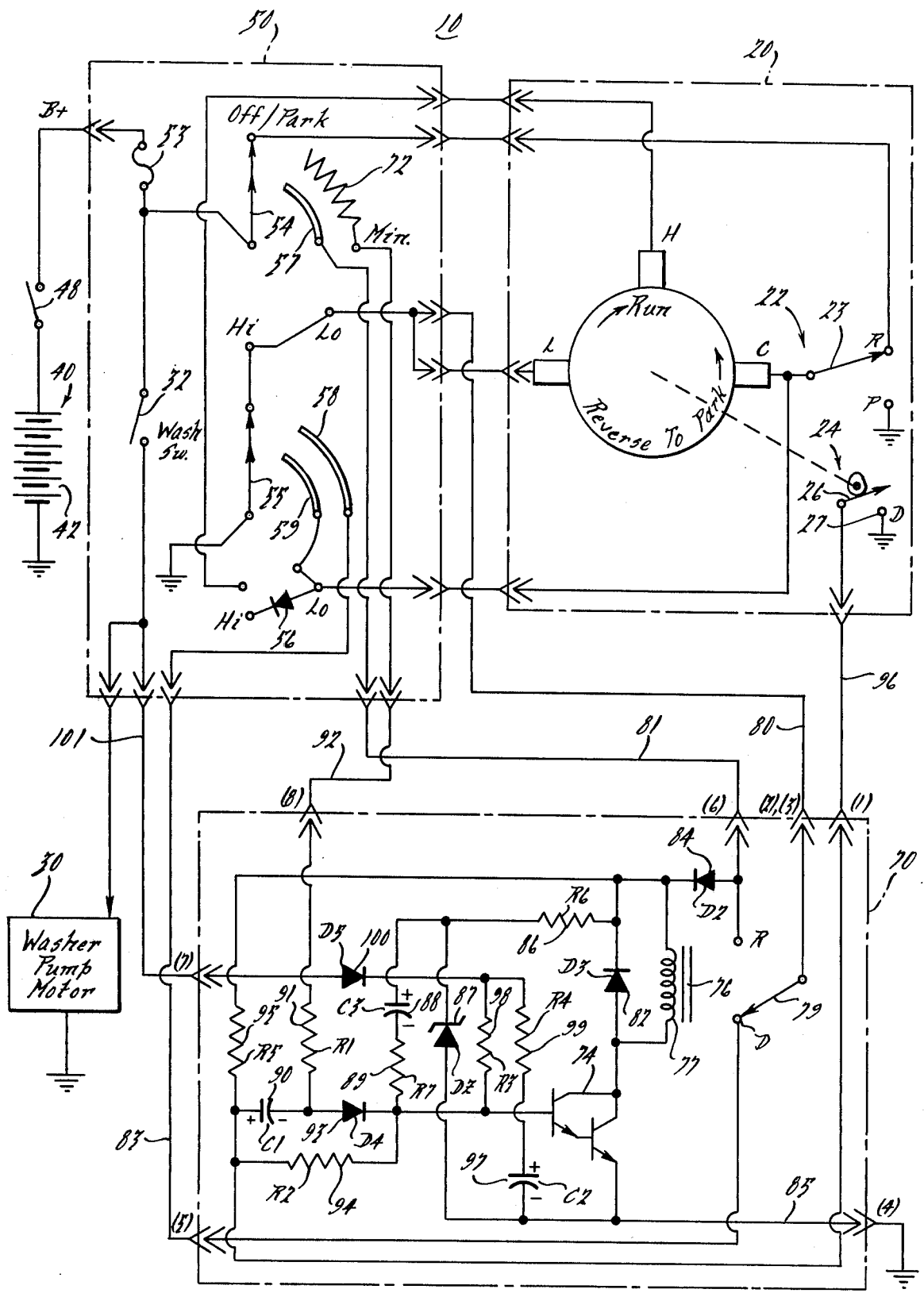

ELECTRONIC CIRCUIT CONTROLLER FOR WINDSHIELD WIPER DRIVE MOTOR

This application is a continuation of application Ser. No. 792,379, filed Apr. 29, 1977, now abandoned.

FIELD AND BACKGROUNS OF THE INVENTION

This invention relates to windshied wiper and wsher motor control systems and, more particularly, to circuit controller therefor which provides several different and desirable modes of operation of a windshield wiper drive motor including an intermittent wipe mode of operation with selectable variable delay periods between successive wiping cycles, a first wipe of instantaneous wipe-before-delay mode of operation and a wipe-after-wash mode of operation of the wiper motor.

Reference is made to U.S. Pat. Nos. 3,219,901; 3,262,042; 3,333,174; 3,339,123; 3,487,282; 3,564,374; 3,623,181; and 3,849,911 showing prior forms of circuit controllers for providing one or more of the above mentioned modes of operation of a windshield wiper drive motor.

The present invention seeks to provide a simple, efficient and reliable circuit controller, which provides all of the advantages and features of the prior forms of windshield wiper-washer system circuit controllers, while reducing the mechanical and electrical complexity, simplifying the functional operation and effecting economies in the cost and construction thereof.

Other objects are to provide an intermittent wipe circuit controller composed of inexpensive electronic and electrical components which are protected from the damaging effects of inadvertent mis-connection to the voltage supply and from high voltage transients presented to the controller and appearing on the supply leads thereto.

SUMMARY

Towards the accomplishment of the above and other objects, the present invention provides an electronic circuit controller for a windshield wiper motor and washer motor system and featuring a single transistor operated at different times from a different one of three different R-C timing networks each sharing or cooperating with the same transistor to provide an intermittent wiping action, an instantaneous wipe-before-delay wiping action and a wipe-after-wash form of wiping action of the wiper motor. The system provides a dynamic braking action of the wiper motor through the electronic circuit controller each time the wiper motor is de-energized in the intermittent wipe mode of operation thereof and further includes a parking control circuit, which reverses the drive motor and dynamically brakes it when the wiper motor selector control switch is turned off.

The above and other objects, features and advantages of the invention, together with the structural composition and functional operation thereof, will appear from consideration of the following detailed description of the preferred embodiment of the invention made with reference to the accompanying schematic electrical circuit drawing of a windshield wiper drive motor and washer pump motor control system for an automotive vehicle.

BRIEF DESCRIPTION OF THE DRAWING

The drawing illustrates an electronic circuit controller for a windshield wiper drive motor according to the present invention.

DESCRIPTION

In the depicted vehicle windshield wiper and washer system 10, the wiper motor and washer motor are shown at 20 and 30, respectively, and are energizable from an electrical source of energy 40, which is carried by the vehicle and includes the vehicle battery 42 and associated battery charging and voltage regulator system of which only the battery is illustrated. The battery 42 is shown as grounded at its negative or return circuit side, with its other or positive terminal side connected through the vehicle ignition switch 48 to the windshield wiper selector switch 50. The latter exerts a superintendent control over the operation of the wiper motor and affords a selection of operation thereof in an intermittent wipe mode through the electronic circuit controller 70 or in a continuous wiping mode in which the wiper motor may be operated at either a low speed or a high speed through further manipulation of the selector switch.

The selector switch 50 may be mounted for actuation on the vehicle instrument panel, or on or from a steering column stalk or other convenient location, and is depicted as a two section or double pole switch with an internal circuit breaker 53 connected in the B+ power feed lead thereto from the vehicle ignition switch 48. The movable poles or blades 54, 55 of the selector switch are conjointly, slidably or rotatively movable from the OFF/PARK position illustrated and through a first range of positions in which the electronic circuit controller 70 is conditioned to operate the wiper motor intermittently with a dwell or delay that varies from a maximum of, say, approximately 15 seconds or so to a minimum of about one or two seconds between successive wiping cycles, depending on the positional setting of the selector switch 50 in the intermittent wipe range or band of settings thereof and on the circuit components tolerances and ambient temperature factors.

From its minimum intermittent wipe dwell setting, the selector switch may be indexed first to a LO speed setting and then to a HI speed setting in which the wiper is operated continuously at a low motor speed or a high motor speed, respectively, to drive the wiper blades through an intervening reduction gear box and cam and linkage assembly (not shown) in a two-stroke wiping cycle, forward or up and then return or down, across the windshield of the vehicle.

Wiper motor 20 is a reversible, two speed, three brush, permanent magnet field D.C. motor of which the brushes L and C are connected through the upper and lower poles 54, 55 of the selector switch to operate the motor as a two brush motor in the LO speed select position of the selector switch 50. In the continuous HI speed select position of the selector switch, all three brushes of the motor are employed, the high speed brush H then being connected to ground through the lower pole 55 of the selector switch, which also returns the common brush C of the wiper motor to ground through a diode 56. The latter element is shown as provided in the selector switch and serves to block an undesirable circulating current, which otherwise would be produced in the absence of the diode and would degrade the torque and efficiency of the motor when it is operated as a three brush motor.

The wiper motor 20 is further provided with a motor direction operated or responsive Park Switch 22 and a motor position operated Dwell Switch 24 of which the Park Switch serves to reversibly energize the wiper motor to reverse its direction of rotation when the selector switch 50 is returned to its OFF/PARK position. Thereafter, the Park Switch establishes a short circuiting dynamic braking circuit for the motor through one of the poles 25 of the selector switch after the motor has been driven in the reverse direction to a point where the wiper blades have been driven to a depressed, parked or rest position off the windshield or below the position to which the blades are returned when the wiper motor is energized and driven in the forward direction.

As shown in the drawings, the Park Switch 22 is a S.P.D.T. switch whose contact blade or pole 55 is connected to the return circuit brush C of the wiper motor and is movable between a pair of stationary contacts, labelled R(Run) and P(Park). The Run contact (R) of the Park Switch is engaged by the movable blade 25 when the wiper motor is running in a forward direction and permits the motor to be reversibly energized to reverse its direction of rotation when the selector switch is returned to the OFF/PARK position. The grounded Park contact (P), which establishes the dynamic braking circuit, is engaged by the movable contact blade 25 after the direction of the motor rotation has been reversed and the wiper blades have been driven to their Park position incident to returning the selector switch 50 to its OFF/PARK position as mentioned above.

The Dwell Switch 24 initiates the dwell or delay period in the intermittent wipe mode of operation of the wiper motor and is a motor position, cam-operated S.P.S.T. switch whose movable contact blade or pole 26 is cyclically actuated to engage the grounded stationary contact 27 in the 0 to 40 degree position of the motor rotational cycle during which the dwell switch is closed. During the remaining 40 to 360 degrees of the motor rotational cycle, the dwell switch is open.

Washer pump drive motor 30 is provided with the windshield washer pump assembly (not shown) and is a conventional single speed D.C. motor, which is connected for energization from the electrical energy source 40 through a wash switch 32. The latter may be incorporated in the selector switch assembly 50 and operated from a separate actuator button or knob or by movement of the actuator lever or knob (not shown) of the selector switch in a plane or direction different from that in which the actuator lever or knob is moved to select the various intermittent and continuous wipe modes of operation of the wiper motor.

The electronic circuit controller 70 cyclically repeatedly energizes and de-energizes the wiper motor 20 in the intermittent wipe mode of operation thereof selected by the selector switch and holds the wiper motor de-energized upon completion of a full rotational cycle of motor operation for a delay or dwell period between successive wiping cycles. The delay period is determined by an internal R-C timing circuit and an externally adjustable resistance or potentiometer device 72, which is operated from and is shown as provided in the selector switch assembly 50. The adjustable resistance device cooperates with the upper pole 54 of the selector switch in such manner as to insert a value of ohmic resistance into the dwell period controlling R-C timing network of the controller that varies from a maximum to a minimum in accordance with the positional setting of the selector switch in the intermittent wipe range of settings thereof.

As further illustrated in the drawing, the electronic circuit controller 70 is a six pin terminal, case grounded structure, which is located remotely from and connected to the selector switch 50 and the wiper motor 20 by external circuit conductors extending therebetween. Internally, the controller is comprised basically of three R-C timing networks, which cooperate with and control an output semiconductor control switching means 74, shown as an NPN type Darlington-connected output or power transistor, and a relay operated switching means 76. The latter includes an operating coil 77, which is connected for energization from the potential source 42 through the output transistor 74 when the selector switch 50 is positioned in any one of intermittent wipe select settings thereof, and a set of normally open and a set of normally closed switching contacts shown in a S.P.D.T. switching arrangement.

The movable pole 79 of the relay switch is connected from pin terminals 2, 3 of the controller to the low speed brush L of the wiper motor, which is connected through the interconnected LO speed and HI speed contacts associated with the upper pole 54 of the selector switch to the grounded lower pole 55 of the selector switch in the OFF/PARK position thereof. When the relay is energized and the selector switch is positioned in the intermittent wipe selection settings thereof, the wiper motor is connected through the LO speed brush L of the movable pole 79 of the relay switch to the high potential side of the battery 42 through the back contact (R) of the relay switch, pin terminal 6 of the controller and external circuit conductor 81 to the elongated contact 57 engaged by the upper pole 54 of the selector switch 50. A diode 82 (D3) connected across the relay coil 77 dissipates the energy therein when the relay is de-energized by the control transistor 74. When the relay coil 77 is de-energized, the movable contact, blade or pole 79 of the relay switch engages its front contact labelled (D), Dwell, which is connected via external conductor 83 to another elongated contact 58 of the selector switch 50 that is connected through the lower pole 55 of the selector switch to the return circuit side of the battery 42. It will be noted that in the deenergized condition of the relay coil, the common brush C of the wiper motor 20 is also connected to the return circuit side of the battery 42 through the elongated contact 59 and the grounded lower pole 55 of the selector switch, whereby the rotor armature of the wiper motor will be directly shorted through the relay contacts and the lower pole of the selector switch in the intermittent wipe position thereof.

Internally of the controller, the normally open, stationary contact (R) of the relay operated switch contained therein is connected through a diode 84, (D2), whose cathode is connected to the high potential side of the relay coil 77. At its other side, the relay coil is connected to the common collector or output electrode of the control transistor 74 whose emitter output electrode is connected to a case grounded bus or terminal 85 of the controller for connection to the return circuit side of the battery. Diode 84 protects the circuitry from a polarity reversal at pin terminal 6 of the controller as may be encountered by inadvertently connecting the B+ supply with the opposite polarity thereto and also blocks negative going transients appearing on the supply lines that could damage the semiconductor circuit components.

A zener diode regulation circuit comprising a limiting resistor 86, which is connected at one side to the cathode of diode 84, and an 8.2 v Zener diode 87, which is connected with the polarity shown between the other side of resistor 86 and the case grounded bus conductor 85, serves to provide a regulated voltage used with one of the aforementioned R.C. timing networks of the controller. This network, comprising the capacitor 88 (C3) and resistor 89 (R7) connected in a series circuit from the cathode at the junction of the Zener diode regulation circuit to the base input control electrode of the transistor 74, serves to provide the instantaneous wipe or first wipe-before-delay wiping action of the wiper motor upon power turn on to the intermittent wipe circuit controller when the selector switch is moved to the intermittent wipe band of settings thereof. This feature assures that the wiper motor will be turned on immediately, without encountering the dwell or delayed turn on thereof characteristic of some of the prior art forms of controllers, such as in U.S. Pat. No. 3,262,042, for example.

The dwell or delay period between successive wiping cycles of the wiper motor is controlled by another R-C timing network comprising main timing capacitor 90 (C1), which is connected at its illustrated normally negatively polarized side to one side of a resistor 91 (R1) whose other side is connected from terminal pin 8 of the controller via external conductor 92 to one side or end of the adjustable resistance device 72 in the selector switch 70. The other side of the resistance device 72 is connected to the upper pole 54 of the selector switch 50, when the switch is moved from its OFF/PARK position to the maximum dwell select position thereof. As the selector switch is moved to its minimum dwell select position, where the potentiometer resistance 72 is effectively cut out of the circuit, a progressively decreasing value of resistance is presented by the timing network to change the dwell period provided by the intermittent wipe controller.

Further associated with the main timing network is a diode 93 (D4), which is poled and connected as shown between the junction of the main timing capacitor 90 and resistor 91 and the base input control electrode of transistor 74; a resistor 94 (R2), which is connected across the series combination of capacitor 90 and diode 93; and a resistor 94 (R5), which is connected between the positively polarized side of capacitor 90 and the cathode of diode 84 (D2). A circuit conductor 96 connects the left or positively polarized side of capacitor 90 from terminal pin 1 of the controller to the movable blade or pole 26 of the Dwell Switch 24.

The third timing network in the controller comprises the capacitor 97 (C2), which is connected in a series circuit with resistors 98 (R3) and 99 (R4) between the base input electrode of the transistor 74 and its emitter output electrode connected to the case grounded bus 85 in the controller. The junction between resistors 98 and 99 is connected to the cathode of another diode 100 (D5) whose anode is connected via external conductor 101 to the load or circuit completing side of the wash switch 32 associated with the selector switch assembly 50. This timing network serves to provide at least one full or extra wiping cycle sufficient to clear the glass of water after the actuator for the wash switch 32 has been released. While the wash switch is actuated, the electronic circuit controller is activated to keep the relay energized and drive the wiper motor continuously, skipping the dwell period that would normally ensue upon closure of the dwell switch at the end of the motor rotational cycle. Then, when the wash switch is released, the aforesaid timing network keeps transistor 74 conductive or on long enough to insure that, for most wash operations, an extra wiping cycle is provided before the controller reverts back to its intermittent wipe mode. Depending on when the wash switch is released by the operator relative to the wiper motor driving cycle, it is possible to obtain up to two extra wipes or nearly two full wiping cycles after wash due to the charge retention of capacitor 97.

Typical values for the aforementioned circuit components associated with the controller are listed below for purposes of illustration and not in a limiting sense.

| Resistor | 72 | 300 K ohms |
|---|---|---|
| " | 86, 95, 99 | 1 K ohms |
| " | 89 | 68 K ohms |
| " | 94, 98 | 100 K ohms |
| Capacitor | 90 (C1) | 47.0 microfarads |
| " | 88, 97 (C2, C3) | 6.0 microfarads |
| Diode | 84 (D2) | 1N4003 |
| " | 84 (D3), 93 (D4), 100(D5) | 1N914 |
| Zener Diode | 87 | 8.2 v., ½ watt |
| Transistor | 74 | 2N5308 |

Operation

I. FIRST WIPE

Movement of the selector switch 50 from its OFF-/PARK position, to say, the maximum dwell position setting thereof, applies B+ through the upper pole 54 and associated elongated contact 57 of the selector switch to terminal pin 6 via conductor 81 and through the adjustable resistor 72 and conductor 92 to terminal pin 8 of the circuit controller 70. With B+ at pin 6, Zener diode 87 conducts, and base drive is provided for transistor 74 through a capacitor charging circuit path for capacitor 88 (C3) from the emitter-base junction of transistor 74 and R7, pulsing transistor 74 and causing it to turn on immediately. Conduction of transistor 74 energizes the relay coil 77, which transfers its contacts from the position shown to apply B+ to the LO speed brush L of the wiper motor 20 and drive it at its low operating speed. As C3 charges towards 8.2 v., the base drive voltage for transistor 74 reduces, but will not have decayed sufficiently to turn off the transistor in the short time the motor has rotated to open the dwell switch at 40 degrees of the motor rotational cycle, at which point in time base drive current is supplied to transistor 74 through resistors 94 (R2) and 95 (R5) to keep the transistor conducting.

It will be noted that during the first wipe interval or the period during which the dwell switch is closed from 0 to 40 degrees of the motor rotational cycle, the left side of the intermittent wipe timing capacitor 90 (C1) is grounded through the closed dwell switch. The right side of C1 will charge towards a potential level at the anode of diode D4 that is equal to the approximately +1.5 v. base-emitter drop of the Darlington transistor 74 plus the nominal +0.6 v. diode drop of diode D4 or a total of 2.1 volts. Timing capacitor C1 thus charges towards this level during this closed dwell switch interval and in a direction opposite to its normal polarization through resistor 91 and the adjustable resistance 72.

II. Intermittent Wipe Mode of Operation

When the dwell switch D4 opens at 40 degrees on the up-stroke portion of the wiper motor rotational cycle, base current drive is supplied for transistor 74 through resistors R2 and R5 connected through diode 84 to B+. The voltage across resistor R2 and R5 will be $[(B+) - E_{D2} - 1.5 \text{ v.}]$ or 9.9 v., a small part (approximately 0.1 v.) of which, will appear across R2 in accordance with the division of the voltage across the resistors or the ratio of R2 to the sum of R2 and R5.

C1 rapidly discharges the positive charge previously attained during the 0–40 degree closed dwell switch interval and rapidly charges in the opposite direction through R5 to a potential level established by $(E_{R2} - E_{D4})$, which is approximately 9.2 v. and places the right side of C1 at 9.2 v below that of the left side thereof or at a level of $-9.2$ v. C1 remains in this condition until the end of the motor rotational cycle at 360° or 0° when the dwell switch recloses to ground the left side of C1.

The charge on C1 then reverse biases D4 so that there is no base current path for transistor 74. The closure of the dwell switch thus effectively grounds the base of transistor 74 through R2. Transistor 74 is immediately rendered non-conductive and de-energizes the relay coil 77, which transfers its contacts back to their normal position shown to de-energize the drive motor. The armature of the motor will then be directly shorted to ground through the transferred contacts of the relay and the lower pole 55 of the selector switch as mentioned earlier to dynamically brake and bring the drive motor to a rapid and abrupt stop. It will be noted that the charge on C1 is of such polarity as to reverse bias diode D2 so that the capacitor C1 will discharge in a circuit through R1 and R72, the battery 42 and the closed dwell switch, the voltage at the end of the resistor R1 connected to the limiting capacitor then being $-9.2$ v. The charge voltage on C1 will be seen to be in a series addition with the battery voltage so that the total voltage across the discharge current carrying resistors R1 and R72 will be 9.2 v. + 12 v. or 21.2 v. at the instant of closure of the dwell switch. This voltage increasing or multiplying action across the discharge circuit resistance at the start of the dwell or delay producing timing interval is well known and similar to that provided in prior forms of timing circuits, as typified by U.S. Pat. No. 2,327,791, for example.

With transistor 74 rendered non-conductive C1 commences to charge towards the 21.2 voltage level across R1 and R72 by first discharging the negative 9.2 v. charge which it acquired when the dwell switch opened at 40 degrees and while it remained open during the 40 to 360 degree interval of the motor rotational cycle. C1 then begins charging positively in the opposite direction toward B+ or 12 volts when the total voltage across R24 and 72 has decayed from 21.2 v by 9.2 v to 12 v. When C1 has charged in the opposite direction to a level of $+0.6$ v at the right side thereof, D4 becomes forward biased, opening a current path through R2, which will then be in parallel with C1 at this time. As C1 continues to charge, the current flow through R2 and D4 will begin raising the base of transistor 74 above ground to turn it back on at about 1.5 volts, thereby energizing the relay which re-energizes the drive motor to start another motor rotational cycle.

III. Wipe-After-Wash

Actuation of the wash switch 32, applies B+ through diode D5 and resistor R3 to provide base current drive for transistor 74 and rapidly charges capacitor C2 to 11.4 volts through resistor R4. Thus, even though the wash switch is actuated when the wiper motor is de-energized during the dwell period portion of the intermittent wipe cycle, the transistor is turned on immediately to energize the wiper motor and to drive it continuously as long as the wash switch is closed.

When the wash switch actuator is released to open the wash switch, diode D5 will prevent the discharge of C2 therethrough. The discharge of C2 will be directed instead through R4, R3 and the base-emitter-junction resistance of transistor 74 to keep the latter conducting until the capacitor has discharged to a level less than the transistor turn on voltage, which is usually less than 1.5 v.

The RC time constant of the discharge circuit should be sufficient and selected to assure that the charge on C2 will be above the turn on voltage of transistor 74 to keep it conducting for the time it takes the wiper motor to complete approximately one full rotation cycle thereof at its operating speed under wet glass conditions which, in the present system, is about 40 rpm or takes about 1.5 seconds for a motor rotational cycle. A time constant nearly equal to or of about this order will assure that regardless of where, in the motor cycle, the wash switch is released, transistor 74 will be held conductive by the charge on C2 to drive the motor into and through the closed dwell switch interval in the subsequent motor rotational cycle, and thus assure the provision of an extra wiping cycle for most wash operations before the controller reverts back to its intermittent wipe mode.

If the wash switch is released on the up or forward stroke of the wiper blades after the dwell switch has opened, say after there is less than ⅔ of the wiping cycle remaining, the motor will drive through the remaining portion and to the end of rotational cycle where the dwell switch closes. At the end of the aforesaid motor rotational cycle, the charge on C2 will still be sufficient to keep transistor 74 conducting and prevent the relay from dropping out and de-energizing the motor for the delay period that would otherwise be provided by the controller when the dwell switch closes at 360°. The motor will be driven into the next rotational cycle and will continue to rotate through ensuing relatively brief 0°–40° closed dwell switch interval during which the dwell producing timing capacitor C1 is unable to discharge appreciably the $-9.2$ v. charge it acquired thereon during the first or preceding rotational cycle. The motor will continue to be energized for the remaining 40°–360° interval of its current cycle, during which the transistor 74 will be kept conducting by the base current drive provided through resistors R2 and R5. Thus, the motor will have completed the remaining ⅔ of the first wiping cycle and another full rotational cycle after the wash switch has been released under the above described conditions and an extra wiping cycle will have been provided to clear the glass of water.

If the remaining charge on C2 at the time when the dwell switch subsequently closes at the end of the first completed extra motor rotational cycle is less than the turn-on voltage required to maintain transistor 74 conductive, the latter turns off to drop out the relay and de-energize the motor. The controller then reverts back to its intermittent wipe mode of operation in which the main timing capacitor C1 may then discharge the −9.2 volt charge, which it acquired during its open dwell switch interval but could not discharge in the above-described wipe after wash mode of operation where the wiper motor was driven into and through the closed dwell switch interval by the capacitor C2 controlled wipe-after-wash-timing network. After the intermittent dwell producing timing capacitor C1 has discharged the −9.2 volt thereon and has charged in the opposite direction to a level which permits transistor 74 to turn on again, the wiper motor is reenergized to terminate the delay period produced by the controller in the intermittent wipe mode of operation thereof.

If the wash switch is released near the beginning of the motor rotational cycle before the dwell switch has opened, the wiper blades will be driven through the up and the following return down stroke thereof to complete a substantially full motor rotational wiping cycle. The timing capacitor C2 will have been discharging during this time. If the remaining charge thereon at the time when the dwell switch subsequently closes at the end of this motor rotational cycle is still above the turn-on voltage required to maintain transistor 74 conductive, the latter keeps the motor energized through the relay contacts to drive the motor into its next rotational cycle and through the relatively brief 0°–40° closed dwell switch interval of the next motor rotational cycle. Thus, release of the wash switch prior to the opening of the dwell switch could very easily result in substantially two complete or extra wipe-after-wash cycles.

From the illustrative parameters, the time constant of the wipe-after-wash discharge circuit, considering only the resistors R4 and R3 and capacitor C2, is 0.606 seconds, so that the time required for the voltage across C2 to decay from 11.4 volts to 1.5 volts will be about 1.23 seconds as determined from the relationship.

$$e^{-t/RC} = 1.5/11.4.$$

If the base-emitter junction resistance and a lower turn on voltage of transistor 74 were considered, the pulse length of the wipe-after-wash timing network circuit would be somewhat longer and actually in the order of the aforementioned period of a rotational cycle of the wiper motor under its wet glass operating conditions to provide at least one extra wipe-after-wash cycle of the wiper motor.

What is claimed is:

1. A windshield wiper drive motor and washer pump motor control system affording an intermittent wipe mode of operation with selectable variable delay periods between successive wiping cycles, a first wipe-before-delay mode of operation and a wipe-after-wash mode of operation of said wiper motor, said wiper motor energized from a source of electrical potential and having a motor position operated dwell switch which is in one condition during an initial portion of each wiper motor rotational cycle and in another condition during the subsequent remainder portion thereof, said system including a double pole selector switch operable from an OFF to an ON position through a range of selectable dwell or delay period positions wherein one of the poles of the selector switch cooperates with and changes the resistance value of an adjustable resistance device which controls the time delay period during which the wiper motor is de-energized between successive wiping cycles in the intermittent wipe mode of operation thereof, a wash switch connected at one side to one side of said source of potential and at its other side to one side of said washer pump motor to activate the latter upon actuation of said wash switch, and an electronic circuit controller including relay switching means having a relay coil energizable to operate a S.P.D.T. relay switch from a first contact position to a second contact position in which one side of said relay coil and one side of said wiper motor are connected to one side of said potential source through said one pole of said selector switch in the ON position thereof, the other side of said wiper motor being connected to the other side of said potential source through the other pole of said selector switch in the ON position thereof, said relay operated switch in its first position connecting said one side of said wiper motor to the other side of said potential source through the said other pole of said selector switch in the ON position thereof, semiconductor switching means controlling the operation of said wiper motor through said relay switching means in each of said modes of operation of said system and having an input control electrode and a pair of output electrodes of which the output electrodes are connected between the other side of said relay coil and the said other side of said potential source, a first R-C timing circuit in said controller affording a first wipe-before-delay or instantaneous turn on mode of operation of said wiper motor with the actuation of said selector switch from its OFF position and including a first capacitor and a first resistor connected in a series circuit between the said one side of said relay coil and the input electrode of said semiconductor switching means, a second R-C timing circuit affording an intermittent wipe control mode of operation with a variable dwell or delay period between successive wiping cycles of said wiper motor and including a second capacitor connected at one side to said motor dwell switch and at its other side to one side of said adjustable delay resistor, a second resistor connected between the said one side of said second capacitor and the said one side of said relay coil and a first diode connected between the said other side of said second capacitor and the input electrode of said semiconductor switching means, and a third R-C timing circuit affording at least one wipe cycle of said wiper motor after actuation of said wash switch to activate said washer pump motor and the release of said wash switch including a third capacitor and a third resistor connected in a series circuit between the base input electrode of said semiconductor switching means and the said other side of said potential source with the junction between said third capacitor and third resistor connected to the side of the wash switch connected to said washer pump motor.

2. A control system in accordance with claim 1 above wherein the said one side of said potential source is the high potential terminal thereof and the said other side of said potential source is the return circuit side or terminal thereof and said semiconductor switching means is an NPN type transistor switching means.

3. A control system in accordance with claim 2 above wherein said transistor switching means is a Darlington connected transistor.

4. A control system in accordance with claim 1 above including a fourth resistor connected from the said other side of said second capacitor to said one side of said variable resistance device to set a discrete minimum dwell period of said wiper motor in the intermittent wipe mode of operation thereof.

5. A control system in accordance with claim 1 above wherein said first capacitor and first resistor are connected to the junction between a current limiting resistor and a zener diode which are connected in a series circuit across said relay coil and the output electrodes of said semiconductor switching means.

6. A control system in accordance with claim 1 above including a second diode connected between the said one side of said relay coil and a contact of said relay switch connected to the said one side of said potential source through the said one pole of said selector switch in the ON position thereof.

7. A control system in accordance with claim 1 above including an additional resistor connected across said second capacitor and said first diode.

8. A control system in accordance with claim 1 including an additional diode connected between the junction of said third capacitor and third resistor and the side of the wash switch connected to said washer pump motor.

9. A control system in accordance with claim 1 above wherein said dwell switch is closed in the initial portion and is open in the subsequent portion of the motor rotational cycle.

10. A control system in accordance with claim 1 wherein the time constant of said first timing network is sufficient to keep the semiconductor switching means conducting through the initial portion of the wiper motor rotational cycle.

11. A control system in accordance with claim 1 wherein the time constant of said second timing network is sufficient to provide a maximum dwell or delay period between successive wiping cycles of said wiper motor of at least 15 seconds in the intermittent wipe mode of operation of said controller.

12. A control system in accordance with claim 1 wherein the time constant of said third timing network is sufficient to keep the wiper motor energized for approximately the period of a motor rotational cycle and provides at least one extra wiping cycle after and irrespective of when the wash switch is released in a preceding motor rotational cycle.

13. A circuit controller device operable in one mode to repeatedly energize and deenergize an electrical drive motor from a source of electrical power and to maintain the motor deenergized for a variably selectable dwell period in accordance with a variable resistor insertable in circuit between one side of said power source and a terminal of said controller device through a first control switch and operable in another mode to provide at least one full rotational drive cycle of said drive motor from a momentary contact actuated switch connected at one side to one side of said power source, said motor having a motor position cyclically operated dwell switch connected at one side to the other side of said power source, said circuit controller device comprising;

a relay having a relay coil, a pair of fixed contacts one of which is coupled to one side of said relay coil and is connected to a first terminal of said controller device for connection to said one side of said power source through said first control switch, and a movable contact connected to a second terminal of said controller device for connection to one side of said drive motor, the other of said fixed contacts connected to a third terminal of said controller device for connection to the other side of said power source with the other side of said drive motor, a transistor device having a base input electrode and collector and emitter output electrodes of which the output electrodes are connected between the other side of said relay coil and a fourth terminal of said controller device for connection to the other side of said power source, a first resistor-capacitor timing circuit connected between said one side of said relay coil and the base input electrode of said transistor device, a second resistor-capacitor timing circuit including a second capacitor connected at one side to a fifth terminal of said controller device for connection to the other side of said motor position, cyclically operated dwell switch, a diode isolation device connected between the other side of said second capacitor and the base input electrode of said transistor device, a second resistor connected between said other side of said second capacitor and a sixth terminal of said controller device corresponding to the terminal thereof for connection to said variable resistor, and a third resistor connected between the said one side of said relay coil and the said one side of said second capacitor, and a third resistor-capacitor timing circuit connected between the base input electrode and the emitter electrode of said transistor device and to a seventh terminal of said controller device for connection to the other side of said momentary contact actuated second switch.

* * * * *